Figure 1:
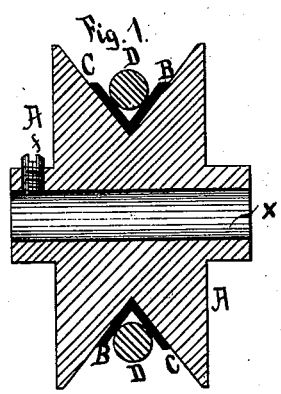

(No Model.)

C. S. WARDWELL.
PULLEY.

No. 334,998. Patented Jan. 26, 1886.

WITNESSES.

INVENTOR.
Claisau S Wardwell
by Phillips Abbott
his ATTORNEY.

UNITED STATES PATENT OFFICE.

CLAISON S. WARDWELL, OF STAMFORD, CONNECTICUT.

PULLEY.

SPECIFICATION forming part of Letters Patent No. 334,998, dated January 26, 1886.

Application filed December 17, 1885. Serial No. 185,879. (No model.)

*To all whom it may concern:*

Be it known that I, CLAISON S. WARDWELL, a citizen of the United States, and a resident of Stamford, in the county of Fairfield and State of Connecticut, have invented certain new and useful Improvements in Pulleys and Wheels, of which the following is a specification.

My invention, more particularly described, consists in applying to the lower part of the groove of grooved pulleys, driving-wheels, and similar mechanical structures a covering or lining of such material as will tend to prevent the slipping of the belt or cord used for transmitting motion or power, thus preventing slipping of the same on the pulleys or wheels, and the sides of the groove are extended outwardly beyond the covering or lining material, thus presenting a smooth surface outside of the covering material, over which the driving belt or cord will slip should it have a tendency to run off the pulley down toward the bottom of the groove, thus preventing this tendency on the part of the belt; and my invention further consists in placing the covering material in a recess provided for it in the bottom of the groove, so that it shall be flush with the surface of the sides of the groove outside of it or a little below the same, if preferred.

In the drawings like letters indicate like parts in all the figures.

Figure 2:
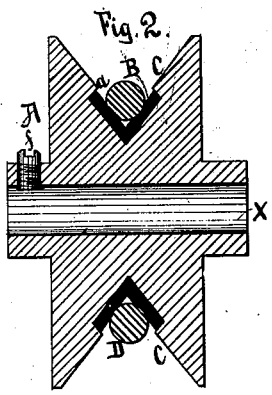
Figure 3:
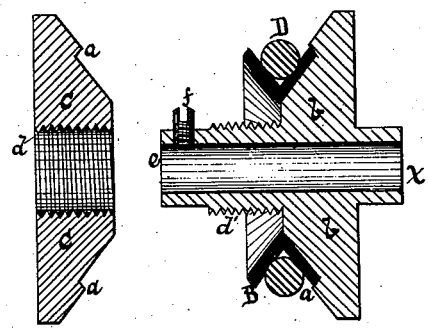
Figure 4:
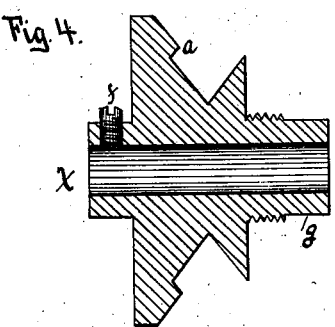
Figure 5:
Figure 5:
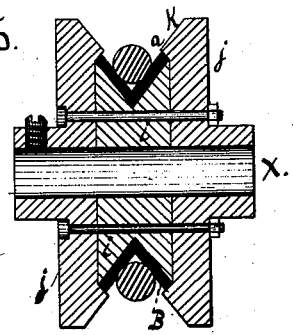

Figure 1 illustrates a vertical cross-section of a pulley embodying the invention in its simplest form. Fig. 2 illustrates a like view of a pulley having the covering or lining material deposited in a recess formed in the bottom of the groove. Fig. 3 illustrates a like view of a pulley made in two parts for the more convenient application of the clinging material. Fig. 4 illustrates a modified form of a pulley made in two parts. Fig. 5 illustrates the method of applying bevel-edged plates to the sides of pulleys or wheels, as heretofore made, thus adapting them to this invention.

The material which I prefer to use as the covering or lining material is india-rubber, because it can conveniently be made in one piece as a continuous ring and stretched into its place in the groove of the pulley or wheel, and will be held there by its own elasticity in most cases; but I do not limit myself to such material, since many other substances—such as certain of the cloths, sand-paper, and the like—may be used, or even roughening the surface of the metal or other material composing the pulley or wheel at the bottom of the groove, leaving it smooth on the upper part of the groove, will accomplish the same result; and since a number of different materials may be used, as stated, with which to line the bottom of the groove to prevent the slipping of the belt, I will hereinafter allude to such materials by the generic name "anti-slipping" material. The anti-slipping material, if elastic, may be held in place by its own elasticity if in ring form, or by cement or in any other suitable manner if not elastic, and cement or other means of securing it in place may also be used if this material be elastic, if desired or necessary; and I do not limit myself to pulleys or wheels of any special size or for any special purpose. I have found, however, that the invention is specially useful in light machinery—such as dental engines, in which the small driven wheel, which is usually attached to the tool-bearing spindle of the machine, is apt, during the manipulation of the tool, to be placed at an angle to the belt or cord, and if the anti-slipping material were placed on the entire surface of the groove up to the edges thereof the clinging action of this material would at once run the belt up the side of the groove when the wheel was at an angle to the line of the belt, and thus run it off.

In Fig. 1, A is the wheel. B is the anti-slipping material placed in the bottom of the groove. C is the smooth surface of the groove outside of the anti-slipping material, and D the belt or cord.

In Fig. 2 I show a recess formed in the bottom of the groove, having shoulders at its upper part, as at $a$. The recess is of the same or a little greater depth than the anti-slipping material B, which is to be placed within it, so that the surfaces of the smooth part of the groove and of the anti-slipping material shall be at least flush, and preferably the smooth part a little higher than the anti-slipping material.

In Fig. 3 I show a pulley made in two parts, $b$ and $c$, threaded together by screw-threads $d\ d$. This construction is useful when it is desired to use anti-slipping material which is not elastic, but which can be made and applied in ring form, thus avoiding seams, because, being non-elastic, it could not be stretched over the periphery of the pulley, but can be slipped onto the hub-like projection $e$, and the part $c$ thereafter slipped onto the hub $e$ and screwed to place. $f$ is a set-screw for fastening the pulley on the spindle. It must of course be removed before attempting to place the anti-slipping material, if non-elastic, or the part $c$, in position. The anti-slipping material, if not elastic, as suggested, may be held in place by cement or in any other suitable manner. I illustrate a ring of this material in place against the part of the wheel marked $b$.

In Fig. 4 I show still another form of pulley or wheel made in two parts, which can be employed when the anti-slipping material is sufficiently elastic to stretch somewhat, but not sufficiently to pass over the outer periphery of the flange-like side pieces. In this construction of the pulley or wheel there is a short hub, $g$, which is threaded externally, and which threads engage with corresponding threads formed in the flange-plate $h$. The wheels or pulleys shown in Figs. 3 and 4 are divided on a circumferential line, as shown.

In Fig. 5 I illustrate devices by the use of which wheels or pulleys which are now in use, (seen at $i$,) in which a belt or cord which practically fills the groove is frequently used, may be adapted to my invention. $i$ is the pulley. B is the anti-slipping material placed in the groove therein. $j\ j$ are two plates, of any suitable material, which are attached to the sides of the pulley $i$ in any suitable manner, preferably by rivets or bolts, as seen at $k\ k$, which pass through the plates and the pulley, suitable holes being bored therein for their reception. The inner surfaces of these plates may be dished, if desired, the diameter of the dished part being about equal to the diameter of the pulley, so that the shoulder $a$, formed by the rim of the dished part, may fit over the edge of the pulley, thus forming an offset or shoulder corresponding to the shoulders $a$ in Fig. 2. These side plates are beveled off outwardly, as at $k$, and are made very smooth at this beveled part, so as to allow of the slipping of the belt over them, as already described. The dishing of the plates $j\ j$ is, however, not essential. In Figs. 3 and 4 I show these shoulders at $a\ a$. It is not essential, however, that these shoulders should be present. I prefer them, however, because they add to the finished appearance of the pulley, and also when used the edge of the anti-slipping material is protected, and the possibility of the belt turning this edge over and pressing the anti-slipping material down into the groove in a rolled-up state is avoided.

In all the figures the hole through the pulley for the reception of a shaft or the end of a spindle is shown at $x$.

I do not limit myself to the details of construction described and illustrated, for it will be apparent to any one skilled in this art that many alterations may be made therein, and still my invention be employed.

Having described my invention, I claim—

1. The combination, in a grooved wheel or pulley, of anti-slipping surfaces at the lower part of the groove, between which the belt normally rests, and smooth sides to the groove at the outer part thereof, over which the belt may slip, substantially as and for the purposes set forth.

2. The combination, in a grooved wheel or pulley, of a recess at the lower part of the groove, within which is placed an anti-slipping material, between the surfaces whereof the belt normally rests, and smooth sides to the groove at the outer part thereof, over which the belt may slip, substantially as and for the purposes set forth.

3. A grooved pulley or wheel made in two parts, divided on a circumferential line, whereby, the parts being separated, an anti-slipping material may be introduced into the lower part of the groove, and the parts of the pulley or wheel again united, substantially as and for the purposes set forth.

4. The combination of a grooved pulley or wheel, the groove whereof has an anti-slipping internal surface, and outwardly-beveled plates fastened to the sides of the pulley, the beveled surfaces of the plates being smooth and extending, substantially, to the edges of the groove in the pulley, as and for the purposes set forth.

Signed at New York, in the county of New York and State of New York, this 14th day of December, A. D. 1885.

CLAISON S. WARDWELL.

Witnesses:
JOHN H. IVES,
CHARLES B. WEBERG.